United States Patent
Song et al.

(10) Patent No.: US 11,428,829 B2
(45) Date of Patent: Aug. 30, 2022

(54) CORRECTION METHOD FOR QUANTIFICATION ACCURACY IMPROVEMENT IN LIST MODE RECONSTRUCTION

(71) Applicant: KONINKLIJKE PHILIPS N.V., Eindhoven (NL)

(72) Inventors: Xiyun Song, San Jose, CA (US); Chuanyong Bai, Solon, OH (US); Jinghan Ye, Livermore, CA (US); Andriy Andreyev, Willoughby Hills, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 204 days.

(21) Appl. No.: 16/963,320

(22) PCT Filed: Jan. 30, 2019

(86) PCT No.: PCT/EP2019/052165
§ 371 (c)(1),
(2) Date: Jul. 20, 2020

(87) PCT Pub. No.: WO2019/149717
PCT Pub. Date: Aug. 8, 2019

(65) Prior Publication Data
US 2020/0363542 A1    Nov. 19, 2020

Related U.S. Application Data

(60) Provisional application No. 62/623,560, filed on Jan. 30, 2018.

(51) Int. Cl.
*G01T 1/29* (2006.01)
*G01T 1/161* (2006.01)
*G01T 1/17* (2006.01)

(52) U.S. Cl.
CPC .......... *G01T 1/2985* (2013.01); *G01T 1/1611* (2013.01); *G01T 1/171* (2013.01)

(58) Field of Classification Search
CPC ..... G01T 1/2985; G01T 1/1611; G01T 1/171; G06T 11/005
(Continued)

(56) References Cited

U.S. PATENT DOCUMENTS

| 6,410,920 B1 | 6/2002 | Shao |
| 2008/0285828 A1 | 11/2008 | Gagnon |

(Continued)

FOREIGN PATENT DOCUMENTS

| WO | 2016170478 A1 | 10/2016 |
| WO | 2019057851 A1 | 3/2019 |
| WO | 2019145398 A1 | 8/2019 |

OTHER PUBLICATIONS

International Search Report and Written Opinion of PCT/EP2019/052165, dated Mar. 27, 2019.

(Continued)

*Primary Examiner* — David P Porta
*Assistant Examiner* — Gisselle M Gutierrez

(57) ABSTRACT

A non-transitory computer-readable medium stores instructions readable and executable by a workstation (18) including at least one electronic processor (20) to perform an image reconstruction method (100) to reconstruct list mode data acquired over a frame acquisition time using a plurality of radiation detectors (17) in which the events of the list mode data is timestamped. The method includes: for the sub-frame bins of a plurality of sub-frame bins into which the frame acquisition time is divided, determining a sub-frame singles rates map for the plurality of radiation detectors from the list mode data whose time stamps reside in the sub-frame bin; determining a singles rate for the singles (Continued)

events of the list mode data using the sub-frame singles rates maps wherein the singles rates for the singles events are determined at a temporal resolution that is finer than the frame acquisition time; determining correction factors for the list mode data using the determined singles rates for the singles events of the list mode data; and reconstructing the list mode data of the frame acquisition time using the determined correction factors to generate a reconstructed image for the frame acquisition time.

20 Claims, 3 Drawing Sheets

(58) Field of Classification Search
USPC .................................................. 250/363.03
See application file for complete search history.

(56) References Cited

U.S. PATENT DOCUMENTS

| 2014/0233821 A1 | 8/2014 | Kelly |
| 2017/0046857 A1 | 2/2017 | Ye |
| 2017/0371046 A1 | 12/2017 | Laurence |

OTHER PUBLICATIONS

Hudson, H.M. et al "Accelerated Image Reconstruction using Ordered Subsets of Projection Data" IEEE Transactions on Medical Imaging, Dec. 1994, pp. 601-609.

Nemer, U. et al "Improving the Quantification Accuracy of a PET/CT-Scanner with Pixelated Large Area Detector", IEEE Transactions, 2015.

CORRECTION METHOD FOR QUANTIFICATION ACCURACY IMPROVEMENT IN LIST MODE RECONSTRUCTION

CROSS-REFERENCE TO PRIOR APPLICATIONS

This application is the U.S. National Phase application under 35 U.S.C. § 371 of International Application No. PCT/EP2019/052165, filed on Jan. 30, 2019, which claims the benefit of U.S. Provisional Patent Application No. 62/623,560, filed on Jan. 30, 2018. These applications are hereby incorporated by reference herein.

FIELD

The following relates generally to the medical imaging arts, emission imaging arts, positron emission tomography (PET) imaging arts, single photon emission computed tomography (SPECT) imaging arts, medical image interpretation arts, image reconstruction arts, and related arts.

BACKGROUND

Positron emission tomography (PET) scanners typically have a relatively narrow axial field of view (FOV). The axial FOV is determined by the number of PET detector rings, and due to the high cost of PET detectors this number is limited, leading to an axial FOV on the order of 10-25 centimeters. When a larger axial range of a patient is to be imaged, it is known to employ multi-station PET imaging protocols, in which a first axial portion of the patient is positioned in the PET axial FOV and imaged at one bed position, then the bed is moved axially to place a next portion of the patient in the axial FOV of the PET scanner and imaged, and so forth. In this way a full torso PET scan or even a whole body PET scan can be performed. Each bed position is referred to in the art as a "frame". In the image reconstruction phase, typically the PET imaging data acquired for each frame is reconstructed to generate a corresponding frame image, and the frame images are then joined together in image space to generate the axially extended PET image. There is usually some overlap of adjacent frames designed into the multi-station PET protocol to facilitate continuous linking of adjacent frame images.

A multi-station PET imaging acquisition session can take a substantial period of time. The radiopharmaceutical dosage is designed to be as low as practicable while providing sufficient image quality in order to minimize radiation exposure of the patient. Consequently, the count rate is low and each frame is typically acquired over several tens of seconds or longer. Thus, it is not uncommon for a multi-station PET imaging session to be on the order of a half hour to an hour or longer.

This long PET imaging data acquisition session duration can introduce difficulties. PET image reconstruction sometimes employs certain correction factors. For example, dead time correction accounts statistically for counts that are missed during time intervals when PET detectors are being triggered by, or processing, earlier counts. The dead time correction increases with increasing count rate. Due to the long duration of the multi-station PET imaging session, the count rate may vary significantly over the PET imaging session. It is known to account for this by computing an individual dead time correction factor for each frame of the multi-station PET imaging, and to reconstruct the imaging data acquired for each frame using the dead time correction factor computed for that frame.

In the case of a PET imaging session with a single station (i.e. a single frame of imaging data is acquired at a single station, without moving the patient bed between stations), a single dead time correction factor is computed and employed. Since only a single frame is acquired, the total acquisition time is consequently shorter than in multi-station imaging.

The following discloses new and improved systems and methods to overcome these problems.

SUMMARY

In one disclosed aspect, a non-transitory computer-readable medium stores instructions readable and executable by a workstation including at least one electronic processor to perform an image reconstruction method to reconstruct list mode data acquired over a frame acquisition time using a plurality of radiation detectors in which the events of the list mode data is timestamped. The method includes: for the sub-frame bins of a plurality of sub-frame bins into which the frame acquisition time is divided, determining a sub-frame singles rates map for the plurality of radiation detectors from the list mode data whose time stamps reside in the sub-frame bin; determining a singles rate for the singles events of the list mode data using the sub-frame singles rates maps wherein the singles rates for the singles events are determined at a temporal resolution that is finer than the frame acquisition time; determining correction factors for the list mode data using the determined singles rates for the singles events of the list mode data; and reconstructing the list mode data of the frame acquisition time using the determined correction factors to generate a reconstructed image for the frame acquisition time.

In another disclosed aspect, a positron emission tomography (PET) imaging method includes: acquiring list mode PET imaging data over a frame acquisition time using a plurality of radiation detectors in which the events of the list mode PET imaging data is timestamped; dividing the list mode PET imaging data into a plurality of sub-frame bins corresponding to a sub-interval of the frame acquisition time; determining a sub-frame singles rates map for the list mode PET imaging data of the sub-frame bins; determining a singles rate for the singles events of the list mode PET imaging data using the sub-frame singles rates maps; determining correction factors for the list mode PET imaging data using the determined singles rates for the singles events of the list mode PET imaging data; and reconstructing the list mode PET imaging data of the frame acquisition time using the determined correction factors to generate a reconstructed PET image for the frame acquisition time.

In another disclosed aspect, a positron emission tomography (PET) image reconstruction device includes an electronic processor. A non-transitory storage medium stores instructions readable and executable by the electronic processor to perform a PET imaging method includes: dividing list mode PET imaging data acquired over the frame acquisition time using a plurality of radiation detectors into a plurality of sub-frame bins corresponding to a sub-interval of the frame acquisition time; determining a sub-frame singles rates map for the list mode PET imaging data of the sub-frame bins; determining a live time factor for the list mode events of the list mode PET imaging data using the sub-frame singles rates maps; and generating a reconstructed PET image by reconstructing the list mode PET imaging data of the frame acquisition time including performing dead time correction using the determined singles rates for the singles events.

One advantage resides in providing improved accuracy in compensating for count rates decay in imaging data due to radiopharmaceutical decay, in the case of a radiopharmaceutical with a temperature drift.

Another advantage resides in providing improved accuracy in compensating for count rates decay in imaging data due to radiopharmaceutical decay, especially in the case of a radiopharmaceutical with a short half-life.

Another advantage resides in determining instantaneous correction factors, or correction factors with high temporal resolution, for emission imaging data based on singles rates of imaging data.

Another advantage resides in generating reconstructed images with compensated dead time factors with radiopharmaceutical decay.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
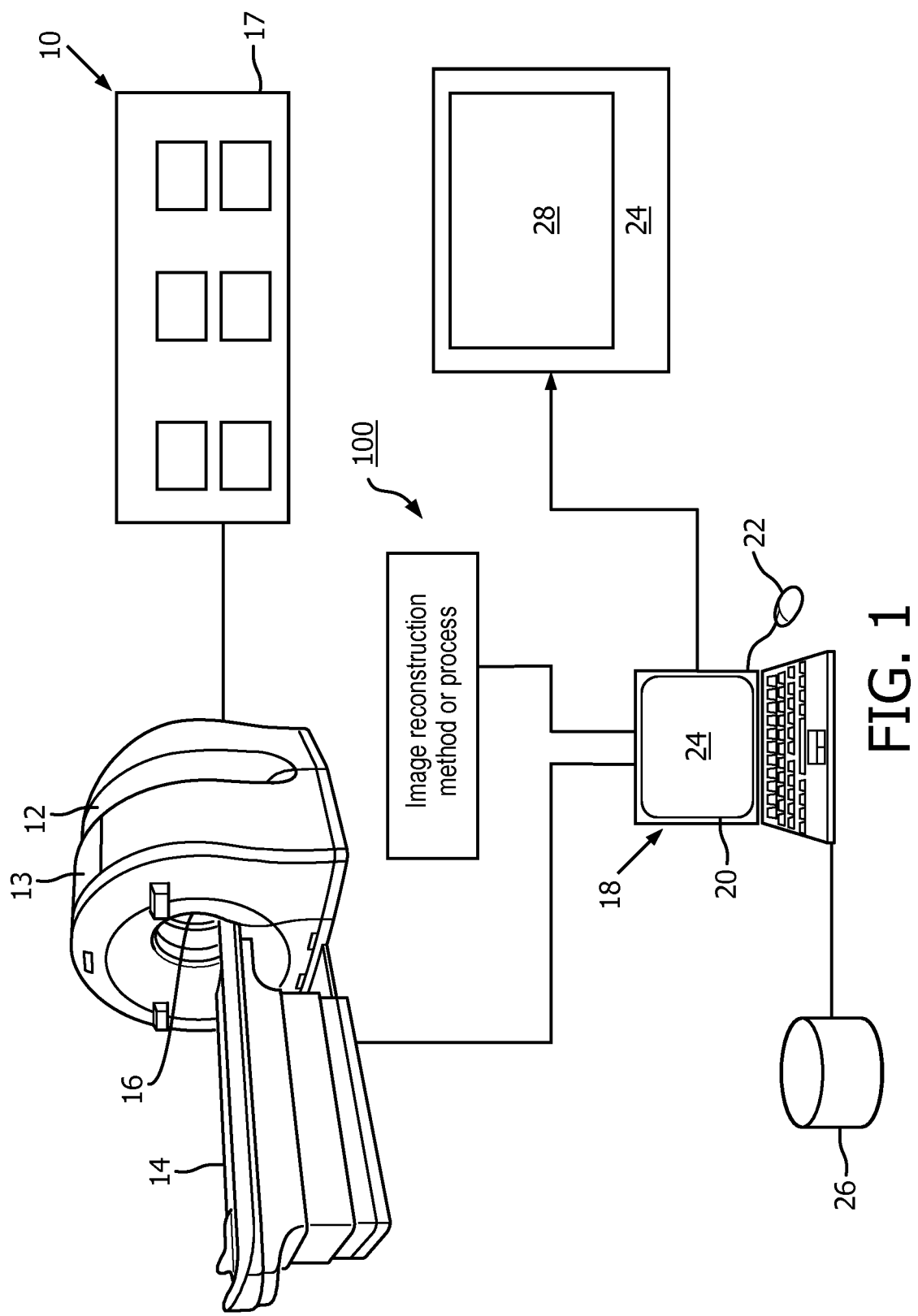
FIG. 1 diagrammatically shows image reconstruction system according to one aspect.

In positron emission tomography (PET) imaging, many factors, such as temperature drift, short-half-life isotopes, activity decrease due to decay, approximation of a model, and the like, can affect a live-time calculation of in PET reconstruction. For example, some PET radioactive tracers use short half-life isotopes, for example, $^{82}$Rb (75 sec), $^{15}$O (122 sec), etc. In PET studies using such tracers for myocardial blood flow (MBF), various bolus scans, perfusion studies, etc., count rates may change over time even within a single frame imaging data acquisition duration due to radioactive decay. Because count loss due to the dead-time effect depends on the count rate (larger dead time for higher count rates), dead-time factor of any line-of-response (LOR) within the same frame duration also changes. Moreover, due to the time constraint imposed by the short half-life, the radiopharmaceutical dosage may be increased, as the higher radiation exposure due to higher dose is offset by reduced radiation exposure due to the short half-life. It is recognized herein that the change in count rate should be taken into account during emission image reconstruction, especially with relatively high level of injected dose of a short half-life radiopharmaceutical.

A disadvantage in current reconstruction methods is that the quantification accuracy can be degraded due to neglect of the change in dead-time factors with activity decay over time within a frame duration. This is true even for list-mode reconstruction because the dead-time factor (or equivalently live-time factor) of each LOR is typically not available for each coincidence event that is recorded at different moment in the list-mode data.

Two common corrections made in PET reconstruction are the live time (or, equivalently, dead time) correction and randoms correction. Live time correction accounts for the fact that at high count rates the PET detector will (statistically speaking) miss some counts during detector recovery intervals between detections. The live time correction is larger at higher count rates. Randoms are coincidences that are not due to true oppositely directed 511 keV gamma rays emitted by a positron-electron annihilation, but rather are due to accidental coincidence between unrelated events. Again, the rate of randoms increases with higher count rates. As previously noted, high count rates are sometimes encountered when employing a short half-life radiopharmaceutical, as the dosage may be increased to compensate for the reduced time duration over which emission imaging data may be acquired. Moreover, the count rate in such a situation will decrease rapidly, i.e. the count rate will decrease by a factor of two over each half-life time interval.

Live time and randoms corrections may be performed based on singles rate maps for the individual detectors, with the live time correction and/or randoms correction for a given line of response (LOR) being associated with a combination (e.g. product) of the singles rate from the map for the two detectors of the LOR. Conventionally, in multi-station PET imaging, the data are collected for each frame (here the imaging bed position) and converted to sinogram data, and corrections are performed using a fixed singles rate map or, at best, perhaps a singles rate map optimized for that frame. This may be acceptable for long half-life radioisotopes.

In the case of shorter half-life radioisotopes, however, it is recognized herein that the subject values can be expected to change significantly over the acquisition time of the frame. That is, if the frame duration (e.g. on the order of a minute or longer for some scans) is comparable with the radioisotope half-life (e.g. 75 sec for $^{82}$Rb, or 122 sec for $^{15}$O) then substantial error is introduced by assuming a constant singles rate map over the frame acquisition. In the case of sinogram data, there is no apparent way around this problem.

In the case of list mode data, however, each event is time stamped. Hence, the disclosed embodiments use corrections utilizing the singles rate map (e.g. live time and/or randoms corrections) can be performed at finer temporal resolution than the frame acquisition time. To this end, the singles rate map is generated at higher temporal resolution than the frame duration. This could be done using hardware for PET systems that log the singles rates of individual PET detectors in real time, or may be computed from the acquired list mode PET imaging data, e.g. in one approach the singles rate for each line of response (LOR) is determined by counting the delayed coincidences (i.e., leveraging the available coincidence detection capability of the PET imaging scanner by using a "delayed" coincidence time window), and the singles rate for a given PET detector is determined based on the delayed coincidences data for LORs involving that PET detector. To allow for sub-frame resolution, the list mode data is binned at a higher temporal resolution than the frame duration and for each sub-frame the single rates for each detector is determined from the data stored in that bin.

With the singles rate maps for sub-frames determined, a more accurate singles rate (i.e. of higher temporal resolution) can be determined for the two detectors of a LOR associated with each count. This may be done using interpolation (or extrapolation) to provide instantaneous values. Live time correction factors are then derived, and optionally also randoms correction factors, which may be applied on a per-count basis. Alternatively, these factors may then be averaged over the frame to provide frame-level values that are more accurate. The resulting improved correction factors of individual events are used during the frame image reconstruction using conventional approaches for live time and/or randoms correction.

In addition to accounting for short half-life radioisotopes, the disclosed approaches can additionally or alternatively automatically compensate for temporal variation of live time and/or randoms caused by dynamic shifting of the radiopharmaceutical distribution in the patient (e.g. fast flow of the radiopharmaceutical into or out of the heart).

Although described herein for PET imaging systems, the disclosed approaches can be employed in conjunction with other types of emission imaging, such as single photon emission computed tomography (SPECT) imaging systems, or in hybrid SPECT/CT or PET/CT imaging systems and the like.

With reference to FIG. 1, an illustrative medical imaging system or device 10 is shown. As shown in FIG. 1, the system 10 includes an image acquisition device 12. In one example, the image acquisition device 12 can comprise a PET gantry of a PET/CT imaging system that further includes a computed tomography (CT) gantry 13. In other examples, the image acquisition device 12 can be a stand-alone PET scanner without a CT component. A patient table 14 is arranged to load a patient into an examination region 16 of the PET gantry 12 or CT gantry 13. The PET gantry 12 includes an array of radiation detectors 17 (diagrammatically indicated in FIG. 1; typically, the radiation detectors of the PET gantry 12 are arranged as a series of PET detector rings arranged to span an axial FOV).

The system 10 also includes a computer or workstation or other electronic data processing device 18 with typical components, such as at least one electronic processor 20, at least one user input device (e.g., a mouse, a keyboard, a trackball, and/or the like) 22, and a display device 24. In some embodiments, the display device 24 can be a separate component from the computer 18. The workstation 18 can also include one or more non-transitory storage media 26 (such as a magnetic disk, RAID, or other magnetic storage medium; a solid state drive, flash drive, electronically erasable read-only memory (EEROM) or other electronic memory; an optical disk or other optical storage; various combinations thereof; or so forth). The display device 24 is configured to display a graphical user interface (GUI) 28 including one or more fields to receive a user input from the user input device 22.

The at least one electronic processor 20 is operatively connected with the one or more non-transitory storage media 26 which stores instructions which are readable and executable by the at least one electronic processor 20 to perform disclosed operations including performing an image reconstruction method or process 100. For example, when the image acquisition device 12 is a PET device, the method 100 may be a PET imaging method. In some examples, the image reconstruction method or process 100 may be performed at least in part by cloud processing.

Figure 2:
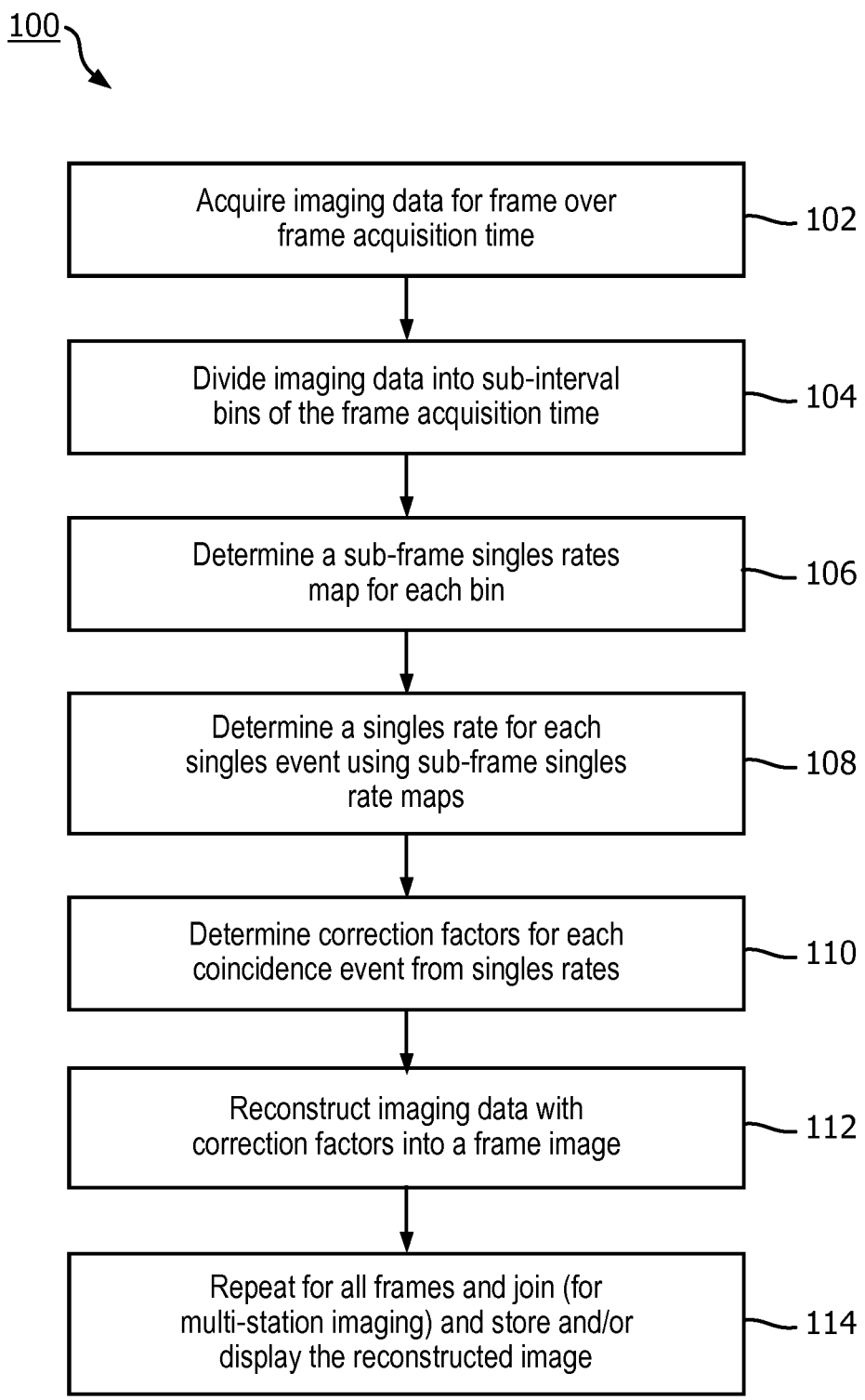
FIG. 2 shows an exemplary flow chart operation of the system of FIG. 1.

With reference to FIG. 2, an illustrative embodiment of the image reconstruction method 100 is diagrammatically shown as a flowchart. At 102, the at least one electronic processor 20 is programmed to control the image acquisition device 12 to acquire imaging data for a frame over a frame acquisition time using the plurality of radiation detectors 17.

In some examples, when the image acquisition device 12 is a PET device, the imaging data can include list mode PET imaging data. Each event of the list mode PET imaging data is timestamped. During the acquisition of the PET imaging data, a positron-emitting radiopharmaceutical (for example, having a half-life of three minutes or less in some embodiments, although a longer half-life is also contemplated) is administered to the patient to be imaged. Some examples of the radiopharmaceutical can include Rb-82 at 75 seconds and O-15 at 122 seconds.

At 104, the at least one electronic processor 20 is programmed to divide the list mode PET imaging data into a plurality of sub-frame bins. Each of the sub-frame bins can correspond to a sub-interval of the frame acquisition time. For example, the frame acquisition time for a frame of the imaging data can have a duration of 20 seconds, as a non-limiting illustrative example. Such a frame can be split into five four-second sub frames. The duration of the bins can have more or fewer sub-frames, with the duration of each sub-frame chosen to provide reasonable counts in each sub-frame. The duration can be equal or unequal, although sub-frames of equal duration can simplify processing. Timestamps of the sub-frames can be recorded as the time at the center of the sub-frame, for example.

At 106, the at least one electronic processor 20 is programmed to determine a sub-frame singles rates map for the list mode PET imaging data of the sub-frame bins whose time stamps reside in the sub-frame bin. In some examples, the at least one electronic processor 20 is programmed to determine the singles rate for each radiation detector 17 from delayed coincidences along all LORs including the radiation detector acquired during the time interval of the sub-frame bin. In some examples, when noise is a concern, filters can be applied to smooth the sub-frame singles rates maps.

At 108, the at least one electronic processor 20 is programmed to determine a singles rate for the singles events (i.e., each singles event) of the list mode PET imaging data using the sub-frame singles rates maps. The singles rates for the singles events are determined at a temporal resolution that is finer than the frame acquisition time over which the imaging data for the frame was acquired.

To do so, in one embodiment, the at least one electronic processor 20 is programmed to interpolate or extrapolate the sub-frame singles rates maps based on time stamps of the sub-frames and the singles event for the radiation detector 17 that acquired the event to determine the instantaneous singles rate at the moment of event detection. In another embodiment, the at least one electronic processor 20 is programmed to set the singles rate for each singles event to the singles rates for the radiation detector 17 that acquired the singles event in the sub-frame singles rate map of the sub-frame bin in which the time stamp of the singles event resides.

At 110, the at least one electronic processor 20 is programmed to determine correction factors for the coincidence events in the list mode PET imaging data using the determined singles rates for the singles events of the list mode PET imaging data.

To do so, in one embodiment, the at least one electronic processor 20 is programmed to determine randoms correction factors based on the determined singles rates for the singles events of the list mode PET imaging data. For example, the relationship between the randoms and singles rates, $R_{AB}=2\tau s_A s_B$, where A and B represent the two detectors connected by a LOR, $s_A$ and $s_B$ are the singles rates of A and B, $R_{AB}$ is the randoms rate, and $\tau$ is coincidence window width, can be used to determine the randoms correction factors. In another embodiment, the at least one electronic processor 20 is programmed to determine live-time correction factors for the list mode events using the singles rates of the corresponding pair of singles events.

At 112, the at least one electronic processor 20 is programmed to reconstruct the list mode data of the frame acquisition time into a frame image using the determined correction factors of the list mode events to generate a reconstructed PET image (i.e. the frame image) for the frame acquisition time. To do so, in one embodiment, the at least one electronic processor 20 is programmed to reconstruct the list-mode events using the determined live-time correction factors and randoms correction factors for the coincidence events to generate a reconstructed PET image for the frame acquisition time. In another embodiment, the at least one electronic processor 20 is programmed to generate the reconstructed PET image by reconstructing the list mode events of the PET data of the frame acquisition time including performing dead time correction using the determined live-time factors for the list mode events and performing randoms correction using the determined randoms correction factors.

The processing operations 102, 104, 106, 108, 110, 112 are performed for a single frame. At 114, in the case of multi-station imaging the patient bed or table 14 is moved to axially move the patient to position the next spatial frame of anatomy in the axial FOV of the PET scanner 12 and the operations 102, 104, 106, 108, 110, 112 are repeated, and so forth to acquire the frame images at operation 112, and the frame images are joined together to generate the final (axially extended) reconstructed image, and the at least one electronic processor 20 is programmed to control the display device 24 to display the reconstructed PET image. If a single-frame imaging session is being performed, then the frame image output at 112 is the final reconstructed PET image, and the operation 114 entails displaying this reconstructed single-frame image. In some examples, the at least one electronic processor 20 is programmed to control the non-transitory storage media 26 to store the clinical image in a suitable database (e.g., a Picture Archiving and Communications System).

Figure 3:
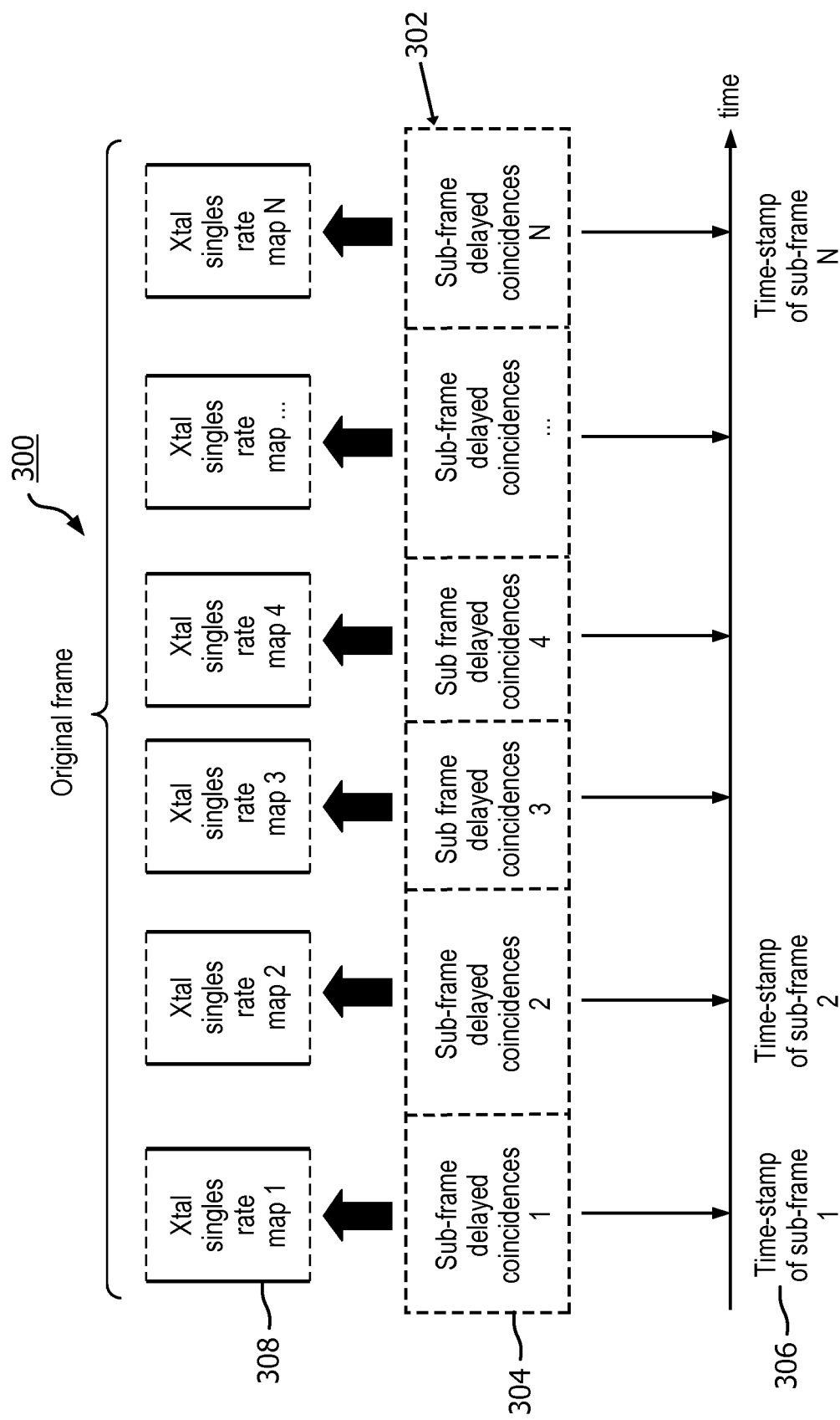
FIG. 3 shows an example operation of the flow chart of FIG. 2.

FIG. 3 shows an example of operation 106 in which a singles rate for each singles event of the list mode PET imaging data is determined using the sub-frame singles rates maps. An acquired image frame 300 is divided into sub-frames 302. A sub-frame delayed coincidence events or delayed coincidence sinogram 304 is determined for each sub-frame 302. The time-stamps 306 of each singles rate 304 is determined. From the coincidence information 304, singles rates map 308 for each sub-frame 302 is determined. From singles rates maps 308 and time-stamps 306 of the sub-frames, a singles rate of each singles event of the list mode PET imaging data is determined using interpolation or extrapolation based on the time-stamp of the event.

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory computer-readable medium storing instructions readable and executable by a workstation including at least one electronic processor to perform an image reconstruction method to reconstruct list mode data acquired over a frame acquisition time using a plurality of radiation detectors wherein the events of the list mode data is timestamped, the method comprising:

for the sub-frame bins of a plurality of sub-frame bins into which the frame acquisition time is divided, determining a sub-frame singles rates map for the plurality of radiation detectors from the list mode data whose time stamps reside in the sub-frame bin;

determining a singles rate for the singles events of the list mode data using the sub-frame singles rates maps wherein the singles rates for the singles events are determined at a temporal resolution that is finer than the frame acquisition time;

determining correction factors for the list mode data using the determined singles rates for the singles events of the list mode data; and reconstructing the list mode data of the frame acquisition time using the determined correction factors to generate a reconstructed image for the frame acquisition time.

2. The non-transitory computer-readable medium of claim 1, wherein determining the singles rate for the singles events of the list mode data includes:

interpolating or extrapolating the sub frame singles rates maps based on time stamps of the sub frame and the singles events for the radiation detector that acquired the singles event in the sub-frame singles rate maps.

3. The non-transitory computer-readable medium of claim 1, wherein determining the singles rate for the singles event of the list mode data includes:

setting the singles rate for each singles event to the singles rates for the radiation detector that acquired the singles event in the sub-frame singles rate map of the sub-frame bin in which the time stamp of the singles event resides.

4. The non-transitory computer-readable medium of claim 1, wherein the list mode data comprises list mode positron emission tomography (PET) imaging data; and determining the sub-frame singles rates map for the sub-frame bins comprises:

determining the singles rate for each radiation detector from all delayed coincidences.

5. The non-transitory computer-readable medium of claim 1, wherein determining correction factors for the list mode data includes:

determining randoms correction factors based on the determined singles rates for the singles events of the list mode data.

6. The non-transitory computer-readable medium of claim 1, wherein the list mode data comprises list mode positron emission tomography (PET) imaging data and determining correction factors for the list mode data using the determined singles rates for the singles events of the list mode data includes:

determining live-time correction factors for list mode events of the PET data using the singles rates of the corresponding pair of singles events.

7. The non-transitory computer-readable medium of claim 6, wherein the reconstructing comprises:

reconstructing the coincidence events using the determined live-time correction factors for the coincidence events to generate a reconstructed PET image for the frame acquisition time.

8. A positron emission tomography (PET) imaging method, comprising:

acquiring list mode PET imaging data over a frame acquisition time using a plurality of radiation detectors wherein the events of the list mode PET imaging data is timestamped;

dividing the list mode PET imaging data into a plurality of sub-frame bins corresponding to a sub-interval of the frame acquisition time;

determining a sub-frame singles rates map for the list mode PET imaging data of the sub-frame bins;

determining a singles rate for the singles events of the list mode PET imaging data using the sub-frame singles rates maps;

determining correction factors for the list mode PET imaging data using the determined singles rates for the singles events of the list mode PET imaging data; and reconstructing the list mode PET imaging data of the frame acquisition time using the determined correction factors to generate a reconstructed PET image for the frame acquisition time.

9. The method of claim 8, wherein determining the singles rate for the singles event of the list mode PET imaging data includes:

interpolating or extrapolating the singles rates for the radiation detector that acquired the singles event in the sub-frame singles rate maps.

10. The method of claim 8, wherein determining the singles rate for the singles event of the list mode PET imaging data includes:

setting the singles rate for each singles event to the singles rates for the radiation detector that acquired the singles event in the sub-frame singles rate map of the sub-frame bin in which the time stamp of the singles event resides.

11. The method of claim 8, wherein determining the sub-frame singles rates map for the sub-frame bin comprises:

determining the singles rate for each radiation detector from delayed coincidences along lines of response (LORs).

12. The method of claim 8, wherein determining correction factors for the list mode PET imaging data includes:

determining randoms correction factors based on the determined singles rates for the singles events of the list mode PET imaging data.

13. The method of claim 8, wherein determining correction factors for the list mode PET imaging data includes:

determining live-time correction factors for list mode events of the PET data using the singles rates the corresponding pair of singles events.

14. The method of claim 13, wherein the reconstructing comprises:

reconstructing the coincidence events using the determined live-time correction factors for the coincidence events to generate a reconstructed PET image for the frame acquisition time.

15. The method of claim 8 further comprising:
displaying the reconstructed PET image.

16. The method of claim 8 wherein acquiring the list mode PET imaging data over the frame acquisition time includes administering a positron-emitting radiopharmaceutical having a half-life of three minutes or less.

17. A positron emission tomography (PET) image reconstruction device comprising:

an electronic processor; and a non-transitory storage medium storing instructions readable and executable by the electronic processor to perform a PET imaging method including:

dividing list mode PET imaging data acquired over the frame acquisition time using a plurality of radiation detectors into a plurality of sub-frame bins corresponding to a sub-interval of the frame acquisition time;

determining a sub-frame singles rates map for the list mode PET imaging data of the sub-frame bins;

determining a live time factor for the list mode events of the list mode PET imaging data using the sub-frame singles rates maps; and generating a reconstructed PET image by reconstructing the list mode PET imaging data of the frame acquisition time including performing dead time correction using the determined singles rates for the singles events.

18. The PET image reconstruction device of claim 17, wherein determining the singles rate for the singles events includes:

interpolating or extrapolating the singles rates for the radiation detector that acquired the singles event in the sub-frame singles rate maps.

19. The PET image reconstruction device of claim 17, wherein generating the reconstructed PET image includes:

determining a live-time correction factor for list mode events of the PET imaging data using the singles rates the corresponding two singles events; and reconstructing the list mode events using the determined live-time correction factors for the list mode events to generate the reconstructed PET image for the frame acquisition time.

20. The PET image reconstruction device of claim 17, wherein the PET imaging method further includes:

determining randoms correction factors based on the determined singles rates for the singles events of the list mode PET imaging data;

wherein the reconstructed PET image is generated by reconstructing the list mode PET imaging data of the frame acquisition time including performing dead time correction using the determined live-time factors for the list mode events and performing randoms correction using the determined randoms correction factors.

* * * * *